(12) United States Patent  
Zhang et al.

(10) Patent No.: US 9,204,180 B2  
(45) Date of Patent: Dec. 1, 2015

(54) METHOD, SERVER AND TERMINAL FOR AUDIO AND VIDEO ON DEMAND

(75) Inventors: Kedong Zhang, Shenzhen (CN); Xin Wang, Shenzhen (CN)

(73) Assignee: SHENZHEN YUNFAN CENTURY TECHNOLOGY CO., LTD., Shenzhen (CN)

( * ) Notice: Subject to any disclaimer, the term of this patent is extended or adjusted under 35 U.S.C. 154(b) by 290 days.

(21) Appl. No.: 13/807,512

(22) PCT Filed: Jun. 28, 2011

(86) PCT No.: PCT/CN2011/076518
§ 371 (c)(1),
(2), (4) Date: Feb. 22, 2013

(87) PCT Pub. No.: WO2012/000429
PCT Pub. Date: Jan. 5, 2012

(65) Prior Publication Data
US 2013/0219441 A1  Aug. 22, 2013

(30) Foreign Application Priority Data
Jul. 2, 2010 (CN) .......................... 2010 1 0218898

(51) Int. Cl.
  *H04N 7/173* (2011.01)
  *H04N 21/258* (2011.01)
  *H04N 21/63* (2011.01)
  *H04L 29/06* (2006.01)
  *H04L 12/18* (2006.01)

(52) U.S. Cl.
  CPC ...... *H04N 21/25808* (2013.01); *H04L 65/4084* (2013.01); *H04L 65/80* (2013.01); *H04N 21/632* (2013.01); *H04L 12/1854* (2013.01)

(58) Field of Classification Search
  CPC . H04N 7/17318; H04N 7/17336; H04N 7/22; H04N 21/6405; H04N 21/4331
  USPC .......................................................... 725/97
  See application file for complete search history.

(56) References Cited

U.S. PATENT DOCUMENTS

| 2005/0212504 A1* | 9/2005 | Revital et al. ................. 324/100 |
| 2008/0066181 A1* | 3/2008 | Haveson et al. ................ 726/26 |
| 2009/0177772 A1* | 7/2009 | Guan ............................ 709/224 |
| 2010/0191855 A1* | 7/2010 | Tian et al. ..................... 709/226 |

FOREIGN PATENT DOCUMENTS

| CN | 101098272 A | 1/2008 |
| CN | 101631061 A | 1/2010 |
| CN | 201766618 U | 3/2011 |
| WO | WO2005119498 A1 | 12/2005 |

OTHER PUBLICATIONS

International Search Report dated (mailed) Oct. 20, 2011; issued in related Application No. PCT/CN2011/076518 for Shenzhen QVOD Technology Co., Ltd. et al. (3 pgs.).

* cited by examiner

*Primary Examiner* — Benjamin R Bruckart
*Assistant Examiner* — Anthony Bantamoi
(74) *Attorney, Agent, or Firm* — Finnegan, Henderson, Farabow, Garrett & Dunner, LLP (57) ABSTRACT

The present invention discloses a method, a server and a terminal of audio-video on demand (AVOD). The method comprises: receiving an audio-video resource request from an AVOD terminal; determining an assigned network the AVOD terminal belonging to in accordance with the audio-video resource request; determining resource nodes having the audio-video resource in the assigned network; generating a resource list according to the resource nodes having the audio-video resource in the assigned network; transmitting the resource list to the AVOD terminal so that the AVOD terminal acquires the audio-video resource according to the resource list. The present invention achieves both a smooth multiuser concurrent online AVOD and a reducing cost consumption of a network system.

15 Claims, 7 Drawing Sheets

METHOD, SERVER AND TERMINAL FOR AUDIO AND VIDEO ON DEMAND

FIELD OF THE INVENTION

The present invention relates to an on-demand technique in the technical field of streaming media, particularly, relates to a method and system for a streaming media on demand over a network by using P2P (Peer to Peer) technique.

BACKGROUND OF THE INVENTION

Currently, most of network on-demand systems are network on-demand systems based on the C/S technique or those based on conventional P2P technique.

In a network on-demand system based on the C/S technique, a sever transfers data with a client via data transport protocols such as HTTP, RTSP, MMS, FTP, etc. A large amount of severs are required to support such on-demand system of a C/S (Master-slave) mode to share and distribute resources, which occupies a big bandwidth and requires a high cost for establishing a media resource station. Therefore, the effect of mass concurrent on-demand is not good.

The P2P technique overcomes shortcomings of the on-demand of a Master-slave mode, and can meet the requirements for mass on-demand from a streaming media. The P2P (Peer to Peer) technique, also called as point to point technical technique or peer-to-peer Internet work technique. Unlike the conventional C/S means, clients of users of P2P network may mutually provide resource including bandwidth, storage space and computation capacity between one another. In brief, it is possible to both download resources and upload resources, and the file interaction may be performed without support from servers. Although the network medium resource on-demand system based on this conventional P2P technique realizes a mass/a large-scale medium on-demand, and has advantages, such as fluent medium on-demand, low cost for establishing a resource station etc., the problems are inevitably encountered, as mentioned below. In particular, the more network resource consumed by medium files, the more prominent the problem seems to be.

Such peer-to-peer operation strategy of the conventional P2P technique excessively emphasizes the peer-to-peer operations of users, which results in the fact that all resources are equally returned back to users irrespective of the locations thereof in a network. The most severe result is that the network resources are wantonly used, and bandwidths in a same network are heavily occupied, even up to 50%~80%, which results in the fact that the hardcore network is burden with a heavy transmission pressure, and the network may be blocked badly when other application programs access to the network. On the other hand, since considerable traffics are also exchanged between different networks in the P2P technique, hereby directly resulting in blocked traffics between different networks and generation of considerably-high running cost.

SUMMARY OF THE INVENTION

The technical problem to be solved by the present invention is to provide a method, a server and a terminal for audio and video on demand (AVOD), which can utilize a network in a high efficient manner, reduce cost and network consumption of a large-scale network medium file on-demand system, and realize a multiuser concurrent on-line on-demand in a fluent manner.

In order to solve the above technical problem, the present invention provides an AVOD method including: receiving an audio-video resource request from an AVOD terminal; determining the network to which the AVOD terminal is assigned in accordance with the audio-video resource request; determining resource nodes having the audio-video resource in assigned network; generating a resource list according to the resource nodes of the audio-video resource in the assigned network; transmitting the resource list to the AVOD terminal so that the AVOD terminal acquires the audio-video resource according to the resource list; wherein the step of generating a resource list according to the resource nodes of the audio-video resource in the assigned network includes: generating the resource list according to the resource nodes having the audio-video resource in the assigned network if the number of the resource nodes having the audio-video resource in the assigned network arrives in a predetermined number; determining whether the other networks have the resource nodes, and generating the resource list according to the resource nodes having the audio-video resource in the other networks and the resource nodes having the resource in the assigned network if the number of the resource nodes having the audio-video resource in the assigned network does not arrive in a predetermined number.

Specifically, the step of acquiring the audio-video resource by the AVOD terminal according to the resource list includes: the AVOD terminal interacting with the resource nodes in the resource list in a P2P manner to acquire the audio-video resource.

Specifically, the step of receiving an audio-video resource request from an AVOD terminal includes: receiving an audio-video resource request from an AVOD terminal via a private communication protocol; or receiving an audio-video resource request that has been authenticated from an AVOD terminal via http protocol.

The above step of determining the network which the AVOD terminal is assigned in accordance with the audio-video resource request includes: acquiring a node IP of the AVOD terminal in accordance with the audio-video resource request; retrieving a comparison table of local IP-network group number and acquiring the group number of the assigned network of the AVOD terminal; determining the network which the AVOD terminal is assigned to in accordance with the group number thereof.

The method further includes the step of, prior to receiving an audio-video resource request from an AVOD terminal, receiving and storing the information from the resource nodes on node including node identification P-ID, node IP address, network monitoring port.

The above resource nodes include: resource releasing servers including the audio-video resource and AVOD terminals including the same, wherein the resource releasing servers are capable of load balance control.

Specifically, the load balance control function includes: restricting the number of access if the number exceeds a predetermined number; prohibiting providing a download service to the AVOD terminal if the AVOD terminal is sufficient to acquire the audio-video resource through the resource list.

The present invention further provides a method of audio and video on demand (AVOD) including: an AVOD terminal transmitting an audio-video resource request including an audio-video resource to a resource server; the AVOID terminal receiving a resource list from the resource server, wherein the resource list includes resource nodes having the audio-video resource assigned to a network to which the AVOD terminal is assigned; the AVOD terminal acquiring the resource nodes having the audio-video resource according to the resource list; establishing connections between the AVOD terminal and the resource nodes having the audio-video resource; the AVOD terminal acquiring the information on the audio-video from the resource nodes having the audio-video resource, and storing and playing them in local.

The resource list including resource nodes having the audio-video resource assigned to a network to which the AVOD terminal is assigned specifically includes: the resource list including resource nodes having the audio-video resource assigned to a network to which the AVOD terminal is assigned if the number of the resource nodes having the audio-video resource in the assigned network arrives in a predetermined number; the resource list including resource nodes having the audio-video resource in other networks and resource nodes having resource in assigned network of the AVOD terminal if the number of the resource nodes having the audio-video resource in the assigned network does not arrive in a predetermined number.

The present invention further provides an AVOD server including: a resource request receiving unit for receiving an audio-video resource request from an AVOD terminal; an assigned network defining unit for determining the network to which the AVOD terminal is assigned in accordance with the audio-video resource request; a resource node defining unit for determining resource nodes having the audio-video resource in the assigned network; a resource list generating unit for generating a resource list according to the resource nodes of the audio-video resource in the assigned network; a resource list transmitting unit for transmitting the resource list to the AVOD terminal so that the AVOD terminal acquires the audio-video resource according to the resource list; wherein the resource list generating unit includes: a resource node number testing unit for determining whether the number of the resource nodes having the audio-video resource in the assigned network arrives in a predetermined number; a first resource list generating module for generating the resource list according to the resource nodes having the audio-video resource in the assigned network in a case where the number of the resource nodes having the audio-video resource in the assigned network arrives in a predetermined number; a resource node determining module for determining the number of the resource nodes having the audio-video resource in other networks in a case Where the number of the resource nodes having the audio-video resource in the assigned network does not arrive in a predetermined number; a second resource list generating module for generating the resource list according to the resource nodes having the audio-video resource in the other networks and the resource nodes having the resource in assigned network in a case where the number of the resource nodes having the audio-video resource in the assigned network does not arrive in a predetermined number.

Specifically, the resource request receiving unit includes: a first resource request receiving module for receiving an audio-video resource request from an AVOD terminal via a private communication protocol; a second resource request receiving module for receiving an audio-video resource request that has been authenticated from an AVOD terminal via the http protocol.

The assigned network defining unit includes: a node IP acquiring module for acquiring a node IP of the AVOD terminal in accordance with the audio-video resource request; a network group number acquiring module for retrieving a comparison table for local IP-network group number and acquiring the group number of the assigned network of the AVOD terminal; an assigned network determining module for determining the network which the AVOD terminal is assigned in accordance with the group number thereof.

The server further includes: a node information receiving unit for receiving and storing the information from the resource nodes on node including node identification P-ID, node IP address, network monitoring port.

The above resource nodes include: a resource releasing server including the audio-video resource and an AVOD terminal including the same, wherein the resource releasing servers are capable of load balance control.

The load balance control function includes: restricting the number of access if the number exceeds a predetermined number; prohibiting providing a download service to the AVOD terminal if the AVOD terminal is sufficient to acquire the audio-video resource through the resource list.

The present invention further provides an AVOID terminal including: a resource request transmitting unit for transmitting an audio-video resource request including an audio-video resource to a resource server; a resource list receiving unit for receiving a resource list from the resource server, wherein the resource list includes resource nodes having the audio-video resource assigned to a network to which the AVOD terminal is assigned; a resource node acquiring unit for acquiring the resource nodes having the audio-video resource according to the resource list; a resource node connecting unit for establishing connections between the AVOD terminal and the resource nodes having the audio-video resource; an audio-video information acquiring unit for acquiring the information on the audio-video from the resource nodes having the audio-video resource, and storing and playing them in local.

Preferably, the resource list includes resource nodes further includes the audio-video resource in other networks in a case where the number of the resource nodes having the audio-video resource in the assigned network does not arrive in a predetermined number.

With the help of at least one of the above technical solutions, the P2P technique is improved on the basis thereof. Terminals in a same network are preferentially determined to carry out a P2P transmission before the P2P transmission is carried out, thereby overcoming the drawbacks of current AVOD systems based on a P2P network. Accordingly, cost and network consumption of a network media file-on demand can be effectively reduced. It is therefore impossible to support concurrent on-line of more users to realize a smoother AVOD.

DETAILED DESCRIPTION OF THE EMBODIMENTS

Figure 1:
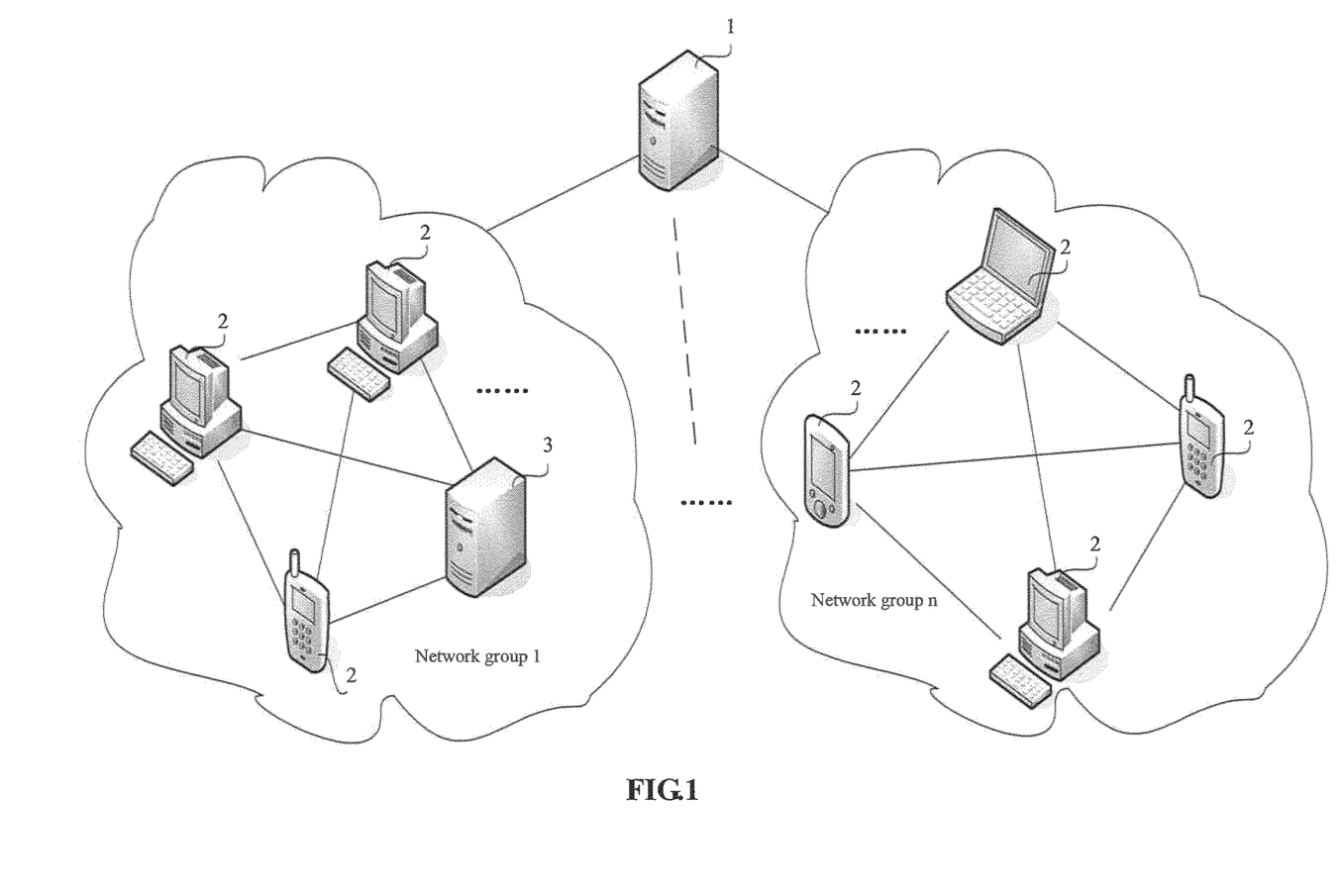
FIG. 1 is a schematic view of the network structure of the network AVOD system according to the present invention.

As shown in FIG. 1, a schematic view of the network structure of the network AVOD system according to the present invention. The network AVOD system includes a P2P network formed by interconnecting several nodes which at least includes a user resource tracing server 1 and several AVOD terminals 2. Several AVOD terminals 2 are located within more than one different network groups 1 to n. In addition, the network AVOD system may further include one or more resource releasing servers 3. These resource releasing servers 3 are distributed in the P2P network and communicate with other nodes in a P2P manner for uploading resource. They provide particular contents to the node in need and may perform a load balance control for an upload process. The AVOD terminals 2 and the resource releasing servers 3 having resources to be uploaded may be generally called as resource nodes.

Figure 2:
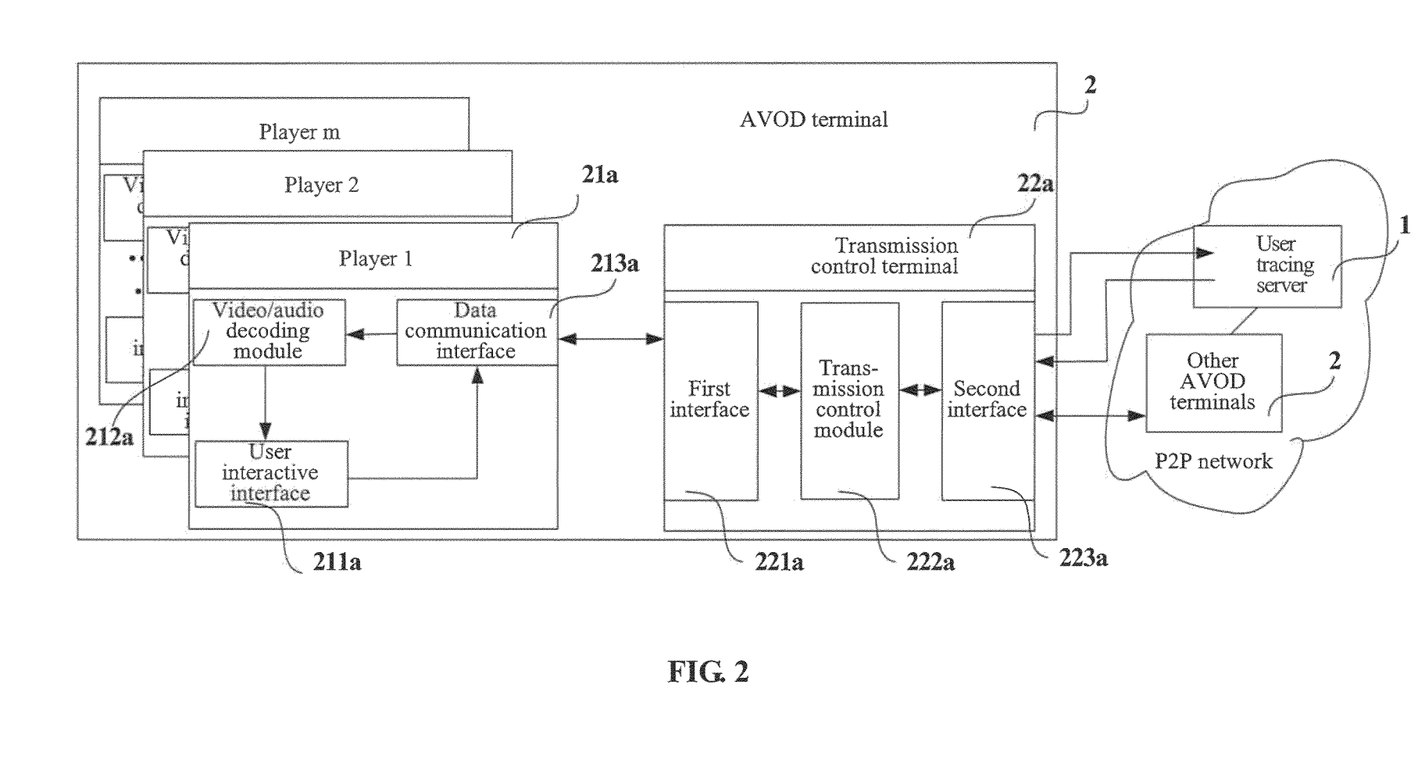
FIG. 2 is structure and signal transmission frame view according to a specific embodiment of the AVOD terminal of the present invention.

As shown in FIG. 2, the AVOID terminal 2 includes one or more players 21a and a transmission control end 22a, the structure connection relationship thereof and a specific embodiment of signal path are shown in FIG. 2. On the AVOD terminal, there are 1~m players included, each of which includes a user interaction interface 211a, a video/audio decoding module 212a and a data communication interface 213a. The transmission control end 22a includes a first interface 221a, a transmission control module and second interface 223a.

When a user inputs a resource request via the user interaction interface 211a of the player on the AVOD terminal, the player 21a requests the transmission control end 22a for resource information and download. After having treated the request, the transmission control end 22a returns treatment results for the response including identification for network resources and download progress to the player 21a.

Specifically, the user inputs the resource request via the user interaction interface 211a. The data communication interface 213a receives the resource request from the user interaction interface 211a and transmits the resource request to the first interface 221a of the transmission control end 22a. The resource request is transmits to the user resource tracing server 1 via the second interface 223a of the transmission control end by using a private protocol. A resource list transmitted from the user resource tracing server 1 is received via the second interface 223a by using a private protocol. The transmission control end 22a interacts with corresponding resource nodes (e.g., other AVOD terminal 2 having the resource to be uploaded or resource releasing servers 3 for providing the particular content) in a P2P manner according to the information on resource nodes provided by the resource list to acquire corresponding resources. A specific embodiment for acquiring the corresponding resource is that the transmission control end 22a establishes a task in local and stores the acquired data in a disk. Another specific embodiment is to store data in a memory.

The player 21a obtains the requested resource data via the data communication interface 213a and the first interface 221a of the transmission control end, and transmits the data of the resource to the video/audio decoding module 212a. The video/audio decoding module 212a transmits the decoded data the user interaction interface 211a and a device for playing sound, renders video to the user via the user interaction interface 211a, and renders audio to the user via the device for playing sound. A specific embodiment for obtaining, by the player 21a, the data of the requested resource from the transmission control end 22a is: the transmission control end 22a voluntarily pushes the required data to the player in response to the resource request from the player. In another embodiment, the player keeps sending request to the transmission control end 22a, and the transmission control end 22a keeps pushing the data requested by the player to the player. In a third embodiment, the transmission control end 22a provides to the player the storage location information and download progress information, and the player voluntarily read the data from the storage location. Here the storage location includes specific disk locations or memory addresses.

Figure 3:
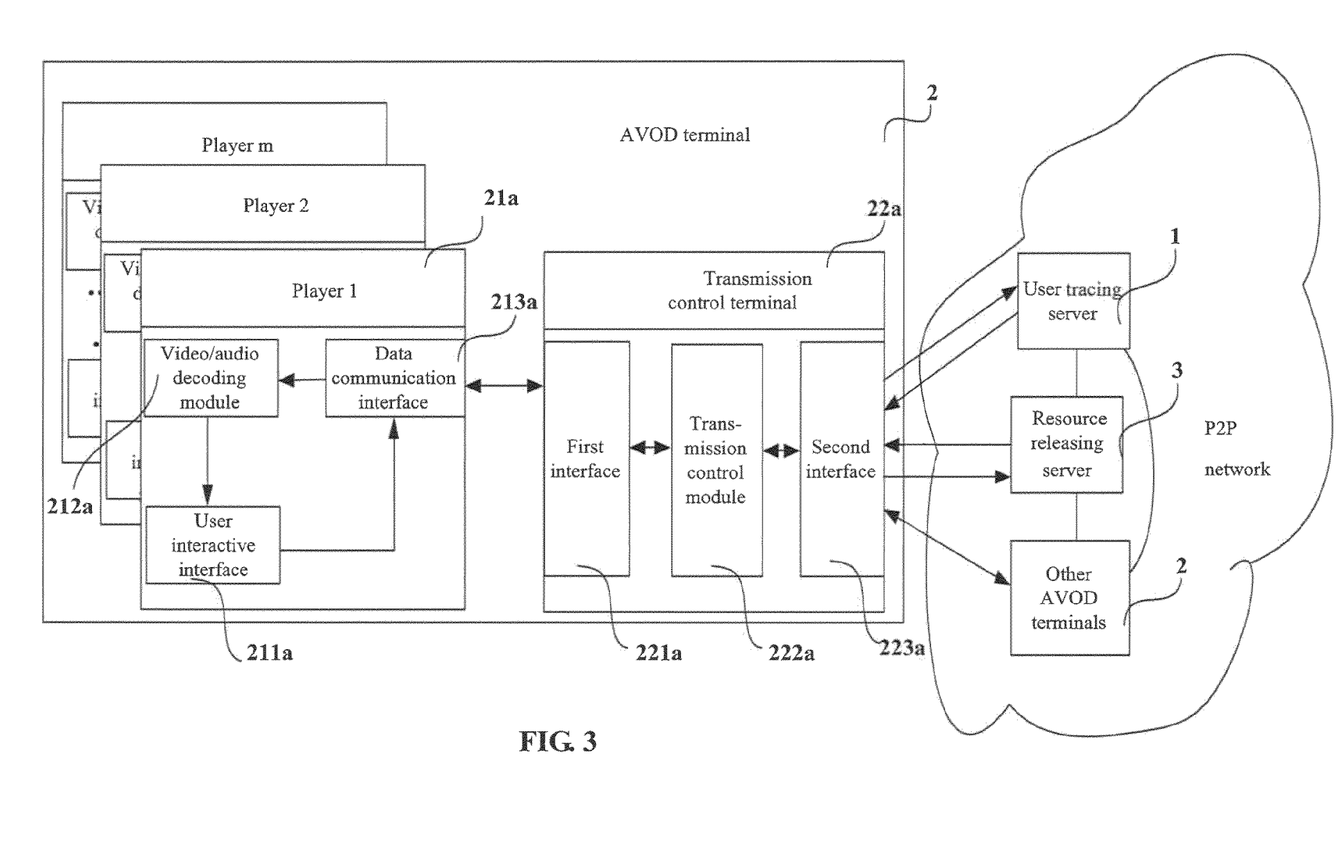
FIG. 3 is another signal transmission frame view of the AVOD terminal as shown in FIG. 2.

An another embodiment as shown in FIG. 3, when the user inputs the resource request via the user interaction interface 211a, the data communication interface 213a receives the resource request from the user interaction interface 211a and transmits the resource request to the first interface 221a of the transmission control end 22a. The transmission control end of the AVOD terminal transmits the resource request to a corresponding server via the second interface 223a of the transmission control end using by the http protocol. The corresponding server may be any one of the resource releasing servers in FIG. 1. After having authenticated and parsed the resource request, the resource releasing server redirects the resource request to the transmission control end of the AVOD terminal, and transmits the redirected resource request to the user resource tracing server via the transmission control end of the AVOD terminal. The rest of the processes are the same as that shown in FIG. 2, and here we will not go into details of them.

Figure 4:
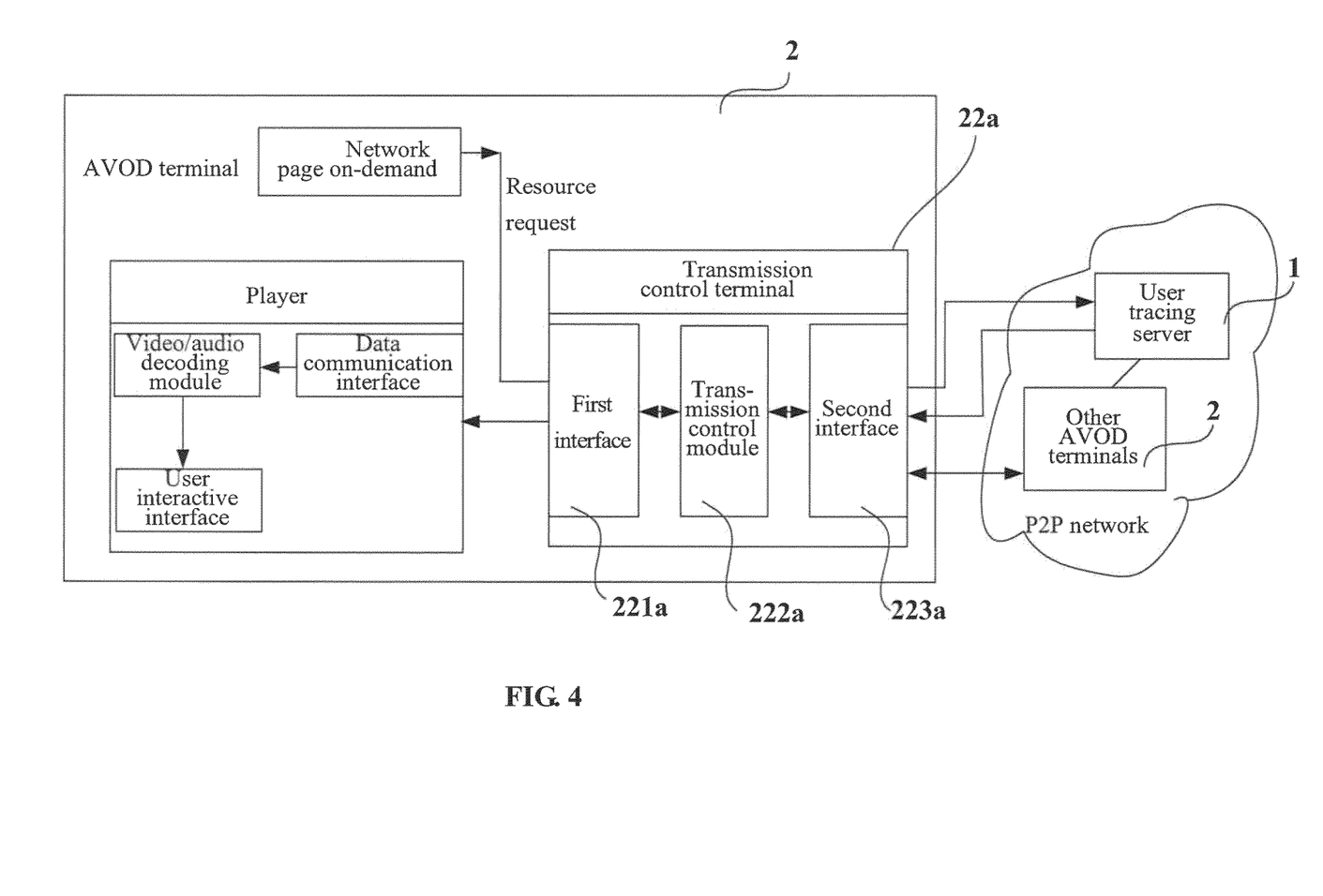
FIG. 4 is a structure and signal transmission frame view according to another specific embodiment of the AVOD terminal of the present invention.
Figure 5:
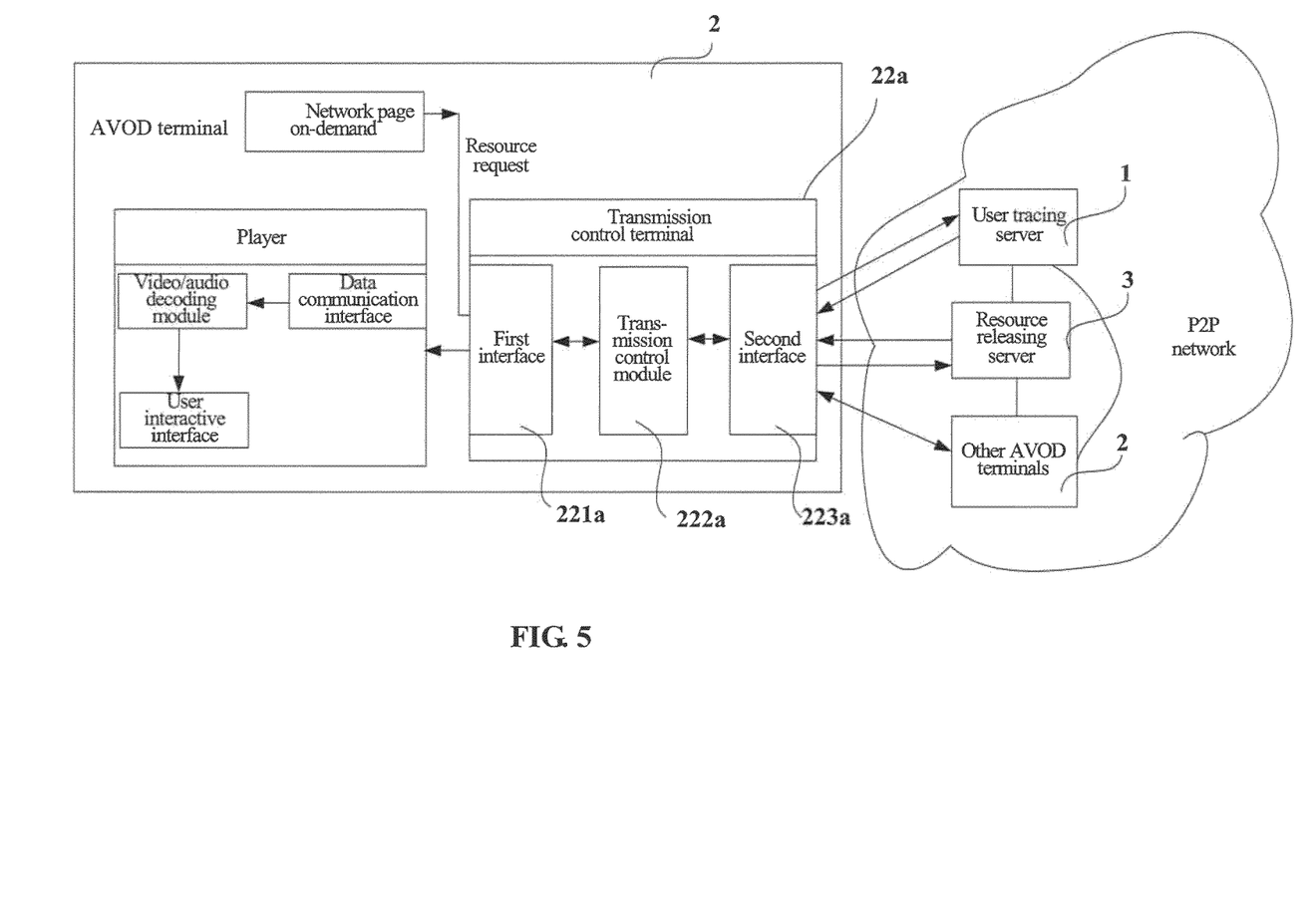
FIG. 5 is another signal transmission frame view of the AVOD terminal as shown in FIG. 4.

The user can input the resource request on the player user interaction interface 211a as shown in FIGS. 2 and 3. The resource request can also be transmitted to a given server (i.e., a certain resource releasing server in this system) in a manner of Web by the AVOD terminal. Here, the structure connection relationship and the signal path are shown in FIGS. 4 and 5. When inputting a resource request (i.e., selecting resource links of playable files) on a Web site by the AVOD terminal, the treatment to the resource request can be accomplished by using either of two manners as shown in FIGS. 2 and 3. That is, as shown in FIG. 4, the transmission control end directly transmits the resource request to the user source tracing server via the second interface 223a by using a private communication protocol. Or, as shown in FIG. 5, the transmission control end transmits the resource request to a corresponding server via the second interface 223a by using the http protocol, and after having authenticated and parsed the resource request, any one of the resource releasing server as shown in FIG. 1 redirects the resource request to the transmission control end of the AVOD terminal, and the following process is the same as that shown in FIG. 2, and here we will not go into details of them.

In the present invention, the user resource tracing server as shown in FIG. 1 records the information on all resource nodes (i.e., nodes having resources to be uploaded). These information include information on unique identification P-IDs, node IP addresses, network monitoring interfaces etc. of all resource nodes, and information like network type, network group number, version number and so on (e.g., the version number of the transmission control end), and owned identifications for resource that can be uploaded (HASH). A specific achievement method is: after network AVOD system is established, each of AVOD terminal and each of resource releasing server serves as a P2P resource node and registers, in the user resource tracing server, information on P-IDs, node H) addresses, network monitoring interfaces of each node, identifications for resource that can be uploaded and so on, and the user resource tracing server acquires and records these information.

Figure 6:
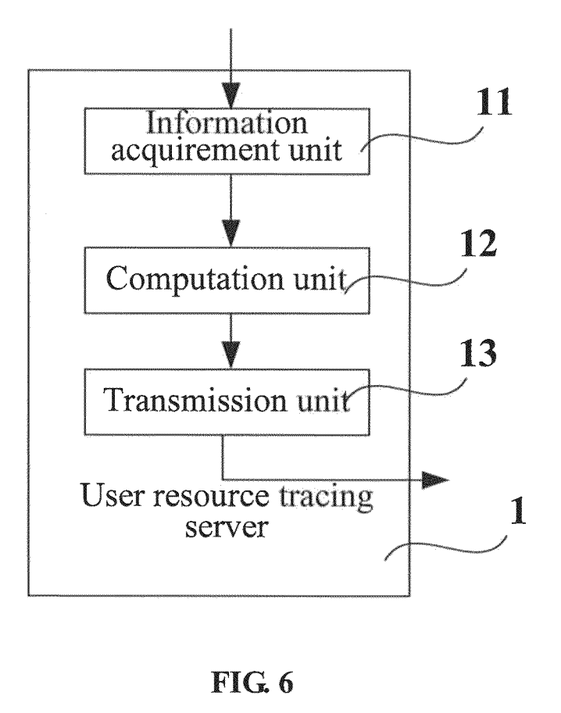
FIG. 6 is a structure and signal transmission frame view according to a specific embodiment of the user resource tracing server of the present invention.

As shown in FIG. 6, the user resource tracing server 1 at least includes an information acquiring unit 11, a computation unit 12 and a transmitting unit 13. The information acquiring unit 11 is used to acquire and record specific information when a resource node registers on the user resource tracing server 1. Herein the specific information includes resource node information representing the identification of the resource node, such as, any one or any combination of the unique identification P-ID, IP addresses, network monitoring interface and network type of the resource nod. In addition, the information further includes resource information, for example, a unique identification calculated through HASH algorithm corresponding to each resource. And, in case of resource request, the information acquiring unit 11 receives the resource request, and transmits it to the computation unit 12.

Upon reception of a specific resource request, the computation unit 12 analyzes the resource request, and learns what is the requested resource information and which network group the AVOD terminal transmitting the resource request is located in, determines the number of resource nodes having the resource and located in the same network group as the AVOD terminal which transmits the resource request. If the determined number of the resource nodes meeting the requirement is enough (for example, within a certain number range), a resource list of information on the resource nodes meeting the requirement is formed and then the resource list is transmitted via the transmitting unit 13 to the AVOD terminal transmitting the resource request. If the determined number of the resource nodes meeting the requirement is not enough to satisfy the requirements, a resource list is then formed by combining the information of the resource nodes having the resource in other network groups in the whole system and the above information of the resource nodes in the present network group. That is, the resource nodes in the resource list can come from more than one network group. For example, an IP address of the AVOD terminal A transmitting the resource request is located within a certain IP section, while the AVOD terminal B is located out of the IP section, in which the IP section represents a network group. The network nodes from other networks, such as the AVOD terminal B can be determined in various manner, for example, closest routing, optimized resource for download, or merely random selection.

In the present invention, the same network can be understood as a network provided by the same operator, for example, the IP section where the above AVOD terminal A is provided by an operator A. That is, several networks provided by different operators can exist in the present invention. However, the nodes in each network are connected with the nodes in the same network or nodes in other network in a P2P connection manner. Therefore, the network AVOD system according to the present invention is a P2P network in general. Since the user resource tracing server can voluntarily recognize the network topology provided by the network operator by calculation upon reception of the resource request, a user can select the optimized download resource or resources with closest routing so that the download speed of a terminal user can be greatly increased. In addition, the present invention avoids network resource between different networks are wantonly used, relieves network pressure, eliminates the waste of the bandwidth resource provided by operators due to repeated download, and hereby reduces network consumption and network cost. On the basis thereof, network video operators can take more efforts in copyright purchase so as to promote network video industry to develop in a healthy way.

Figure 7:
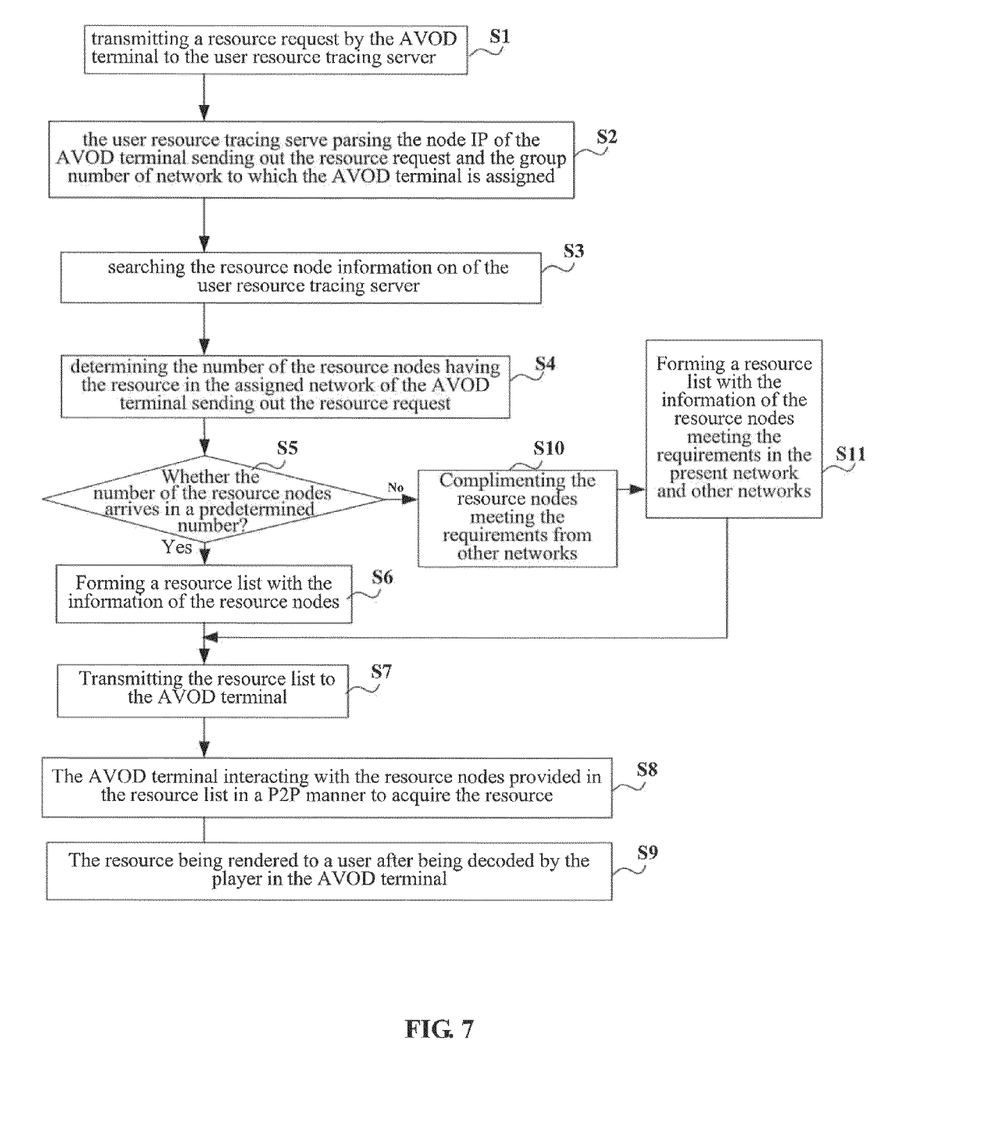
FIG. 7 is a flow chart of a specific embodiment of the method of network AVOD according to the present invention.

Based on FIG. 7, in combination with FIGS. 1, 2-5, the specific embodiment of the method of AVOD provided by the present invention includes the following steps:

Step S1, transmitting a resource request by the AVDO terminal 2 to the user resource tracing server 1.

In this step, the user can input a resource request through two manners: one is the player 21*a* on the AVOD terminal, the other is a Web manner. When the player 21*a* inputs the resource request, signals are transferred as shown in FIGS. 2 and 3. When inputting the resource request, URLs of the files to be played on network like Internet or user-defined protocol addresses can be input; when the resource request is inputted in a Web manner, signals are transferred as shown in FIGS. 4 and 5, when inputting the resource request, it is possible to select a link of the resource to be played on the current video web page. The resource requests inputted in these two manners are transmitted to the user resource tracing server by the transmission control end of the AVOD terminal by using a private communication protocol.

Step S2, upon reception of the resource request, the user resource tracing server parses from the resource request the node IP of the AVOD terminal sending out the resource request, searches the IP-network group number comparison table stored in the user resource tracing server according to the node IP and obtains the group number of the network group to which the AVOD terminal is assigned;

Step S3, resource node information stored in the user resource tracing server is searched according to the received resource request, i.e. the request for resource (hash);

Step S4, how many resource nodes having the resources in the assigned network group of the AVOD terminal which transmits the resource request is determined, that is, the number of the resource nodes having the resource in the assigned network group is determined;

Step S5, whether the number of resource nodes meeting the requirements falls within a predetermined number range, for example, 40~50 (the number set by the system), is determined, if it falls within the range, the information on these resource nodes meeting the requirements is formed a resource list in step S6; if the number of resource nodes meeting the requirements is not enough to arrive in this range and is not enough to meet the requirement for number, then the information on resource node including the resource in other network group in the whole system and the above information on resource nodes meeting the requirements in the present network group are combined together to form a resource list in steps S10 and S11, that is, the resource nodes in this resource list come from more than one network group, in which resource nodes come from other networks can be determined in various manners.

Step S7, the resource list is transmitted to the AVOD terminal;

Step S8, transmission control end in the AVOD terminal receives the resource list via the second interface, interacts with the resource nodes provided in the resource list to acquire resources in a P2P manner by using a private communication protocol;

Step S9, the transmission control end in the AVOD terminal transmits the acquired resource to the player. After decoded by the video/audio decoding module, video images are rendered to the user through a user interaction interface, and voices are rendered to the user through a voice playing device.

In addition, in the step S8, after having acquired the resources, the AVOD terminal shares the acquired resources in the network, provides upload service to the node that requires the resource.

Additionally, the network AVOD system of the present invention as shown in FIG. 1 further includes the resource releasing server 3 including a resource upload unit and a control unit. The resource upload unit is used to provide resource upload service, and to transmit the node information of the resource releasing server to the user resource tracing server; the upload control unit is used to carry out a load balance control when the resource upload unit provides resource upload service.

The load balance control includes two aspects. On the one hand, when the resource releasing server 3 provides the same resource to several AVOD terminals, whether the number of the request for this resource arrives in a maximum number of request, for example, providing the same resource to 50 AVOD terminals, is determined. If the number of the request exceeds the maximum number of request, the newest connection with the AVOD are disconnected; if the number of the request falls within the maximum number of request, the new resource requests are anew received.

On the other hand, the resource releasing server acquires from the user tracing server in the P2P network the number of the resource nodes having the upload resource, and determines whether the number arrives in a predetermined range. If yes, the resource releasing server rejects the request for download of the new link of the resource.

By the control of the upload resource of two above aspects, the resource releasing server can effectively lower the bearing capacity of the resource releasing server.

The AVOD terminals 2 in the present invention can be various kinds of network terminals like personal computer, embedded devices like set-top box, smartphone and so on. The resource releasing server 3 can be a server providing specific contents like news, advertisement, teleplay, movie, music and so on by any network operator. The number of the user resource tracing server is FIG. 1 is only one, but not exclusively, which can be more. In case of several tracing servers, a distributed connection can be applied.

It is possible to voluntarily recognize network topology provided by the network operator by the method and system of the AVOD according to the present invention, a user can select the optimized download resource or resources with closest routing so that the download speed of a terminal user can be greatly increased. In addition, the present invention avoids network resource between different networks are wantonly used, relieves network pressure, eliminates the waste of the bandwidth resource of an operator due to repeated download, and hereby reduces network consumption and network cost.

Finally, it should be noted that the above embodiments merely are explanatory and are not restrictive of the present invention. Although the present invention is detailedly explained with reference to preferred embodiments, it will be understood by those skilled in the art that amendment or equivalent alternative can be made herein without departing from the spirit and scope of the invention, and they all should be covered by the scopes of the claims of the present invention.

DRAWINGS

FIG. 1
网络组 1: Network group 1, 网络组 n: Network group n
FIG. 2
1: User tracing server
播放器 m: Player m
播放器 2 : Player 2
21a: Player 1
212a: Video/audio decoding module
213a: Data communication interface
211a: User interactive interface
221a: First interface
222a: Transmission control module
223a: Second interface
2: 点播终端 AVOD terminal
2: 其他点播终端 Other AVOD terminals
P2P 网络 : P2P network
FIG. 3
1: User tracing server
P2P 网络 : P2P network
播放器 m: Player m
播放器 2: Player 2
21a: Player 1
224a: Transmission control end
212a: Video/audio decoding module
213a: Data communication interface
211a: User interactive interface
221a: First interface
222a: Transmission control module
223a: Second interface
2: 点播终端 AVOD terminal
2: 其他点播终端 Other AVOD terminals
3: Resource releasing server
FIG. 4
P2P 网络 : P2P network
1: User tracing server
点播网站页面 : Network page on-demand
播放器 : Player
视频/音频解码模块 : Video/audio decoding module
数据通讯接口 : Data communication interface
用户交互界面 : User interactive interface
资源请求 : Resource request
221a: First interface
222a: Transmission control module
223a: Second interface
2: 点播终端 AVOD terminal
2: 其他点播终端 Other AVOD terminals
FIG. 5:
P2P 网络 : P2P network
User tracing server
点播网站页面 : Network page on-demand
播放器 : Player
视频/音频解码模块 : Video/audio decoding module
数据通讯接口 : Data communication interface
用户交互界面 : User interactive interface
资源请求 : Resource request
221a: First interface
222a: Transmission control module
223a: Second interface
2: 点播终端 AVOD terminal
2: 其他点播终端 Other AVOD terminals
3; Resource releasing server
FIG. 6
11: Information acquiring unit
12: Computation unit
13: Transmitting unit
1: User resource tracing server
FIG. 7:
S1: transmitting a resource request by the AVOD terminal to the user resource tracing server
S2: the user resource tracing serve parsing the node IP of the AVOD terminal sending out the resource request and the group number of network to which the AVOD terminal is assigned
S3: searching the resource node information on of the user resource tracing server S4: determining the number of the resource nodes having the resource in the assigned network of the AVOD terminal sending out the resource request S5: whether the number of the resource nodes arrives in a predetermined number?

否: No

S10: Complimenting the resource nodes meeting the requirements from other networks S11: Forming a resource list with the information of the resource nodes meeting the requirements in the present network and other networks 是: Yes S6: Forming a resource list with the information of the resource nodes S7: Transmitting the resource list to the AVOD terminal S8: The AVOD terminal interacting with the resource nodes provided in the resource list in a P2P manner to acquire the resource S9: The resource being rendered to a user after being decoded by the player in the AVOD terminal

What is claimed is:

1. A method of audio and video on demand (AVOD), comprising:
   receiving resource information of a plurality of resource nodes, the resource information including one or more resource identifications determined based on an HASH algorithm;
   receiving an audio-video resource request from an AVOD terminal;
   determining an assigned network to which the AVOD terminal belongs, in accordance with the audio-video resource request;
   determining, based at least on the resource information a number of resource nodes having the audio-video resource in the assigned network;
   if the number of resource nodes is equal to or greater than a threshold, generating a resource list according to the resource nodes having the audio-video resource in the assigned network;
   if the number of resource nodes is less than the threshold, generating the resource list according to the resource nodes having the audio-video resource in other networks together with the assigned network; and
   transmitting the resource list to the AVOD terminal for acquiring the audio-video.

2. The method according to claim 1, wherein the audio-video resource is acquired by the AVOD terminal interacting with the resource nodes in the resource list in a P2P manner to acquire the audio-video resource.

3. The method according to claim 1, wherein the step of receiving an audio-video resource request from an AVOD terminal comprises:
   receiving an audio-video resource request from the AVOD terminal via a private communication protocol; or
   receiving an audio-video resource request that has been authenticated from an AVOD terminal via an http protocol.

4. The method according to claim 1, wherein the step of determining the assigned network to which the AVOD terminal belongs in accordance with the audio-video resource request comprises:
   acquiring a node IP of the AVOD terminal in accordance with the audio-video resource request;
   searching a local comparison table of IP-network group numbers for obtaining a group number of the assigned network;
   determining the assigned network in accordance with the group number.

5. The method according to claim 1, wherein before receiving node information from the resource nodes, the node information comprising a node identification P-ID, a node IP address, and a network monitoring interface.

6. The method according to claim 1, wherein the resource nodes comprise:
   at least one resource releasing server having the audio-video resource; and at least one AVOD terminal having the audio-video resource,
   wherein the at least one resource releasing server includes a load-balancing control function.

7. The method according to claim 6, wherein the load-balancing control function of the at least one resource releasing server comprises:
   denying an access request for the audio-video resource if a number of accesses to the audio=video resource exceeds a predetermined number; and/or
   prohibiting providing a download service to the AVOD terminal upon determining that the resource list is sufficient to acquire the audio-video resource.

8. A method of audio and video on demand (AVOD), comprising:
   transmitting at an AVOD terminal to a resource server an audio-video resource receiving at the AVOD terminal a resource list from the resource server, wherein the resource list comprises resource nodes in a network having the audio-video resource and comprises resource information including one or more resource identifications determined based on an HASH algorithm and;
   generating a resource list according to the resource nodes having the audio-video resource in the assigned network if the number of resource nodes is equal to or greater than a threshold, and generate the resource list according to resource nodes having the audio-video resource in other networks together with the assigned network if the number of resource nodes is less than the threshold;
   acquiring at the AVOD terminal the resource nodes having the audio-video resource according to the resource list;
   establishing connections between the AVOD terminal and the resource nodes having the audio-video resource;
   acquiring at the AVOD terminal audio-video data from the resource nodes having the audio-video resource and buffering and displaying the audio-video data.

9. An audio and video on demand (AVOD) server, comprising:
   an information acquiring unit configured to receive resource information of a plurality of resource nodes, the resource information including, one or more resource identifications determined based on an HASH algorithm, and
   receive an audio-video resource request from an AVOD terminal;
   a computation unit configured to
   determine an assigned network to which the AVOD terminal belongs in accordance with the audio-video resource request,
   determine, based at least on the resource information, a number of resource nodes having the audio-video resource in the assigned network,
   generate a resource list according to the resource nodes having the audio-video resource in the assigned network if the number of resource nodes is equal to or greater than a threshold, and generate the resource list according to resource nodes having the audio-video resource in other networks together with the assigned network if the number of resource nodes is less than the threshold; and a transmitting unit configured to transmit the resource list to the AVOD terminal for acquiring the audio-video resource according to the resource list.

10. The AVOD server according to claim 9, wherein the information acquiring unit is configured to receive the audio-video resource request comprises the information acquiring unit being configured to:

receive an audio-video resource request from the AVOD terminal via a private communication protocol; and receive an audio-video resource request that has been authenticated from an AVOD terminal via an http protocol.

11. The AVOD server according to claim 9, wherein the computation unit is configured to determine the assigned network comprises the computation unit being configured to:

acquire a node IP of the AVOD terminal in accordance with the audio-video resource request;

search a local comparison table of IP-network group numbers for acquiring a group number of the assigned network to which the AVOD terminal belongs; and determine the assigned network to which the AVOD terminal belongs in accordance with the group number.

12. The AVOD server according to claim 9, wherein the information acquiring unit is further configured to:

receive node information from the resource nodes, the node information comprising a node identification P-ID, a node IP address, and a network monitoring interface.

13. The AVOD server according to claim 9, wherein the resource nodes comprise:

at least one resource releasing server having the audio-video resource; and at least one AVOD terminal having the audio-video resource, wherein the at least one resource releasing server has a load-balancing control function.

14. The AVOD server according to claim 13, wherein the load-balancing control function comprises:

denying an access request for the audio-video resource if a number of accesses to the audio-video resource exceeds a predetermined number; and/or prohibiting providing a download service to an AVOD terminal upon determining that the resource list is sufficient to acquire the audio-video resource.

15. An audio and video on demand (AVOD) terminal, comprising:

transmission control terminal configured to transmit to a resource server a request for an audio-video resource;

receive a resource list from the resource server, wherein the resource list comprises resource nodes having the audio=video resource in an assigned network to which the AVOD terminal belongs and comprises resource information including one or more resource identifications determined based on an HASH algorithm, acquire the resource nodes having the audio-video resource according to the resource list;

generate a resource list according to the resource nodes having the audio-video resource in the assigned network if the number of resource nodes is equal to or greater than a threshold, and generate the resource list according to resource nodes having the audio-video resource in other networks together with the assigned network if the number of resource nodes is less than the threshold;

establish connections between the AVOD terminal and the resource nodes having the audio-video resource; and one or more players configured to acquire audio-video data using the resource nodes having the audio-video resource and to buffer and display the audio-video data.

* * * * *